United States Patent
Warf et al.

[11] Patent Number: 5,387,267
[45] Date of Patent: Feb. 7, 1995

[54] PROCESS AND APPARATUS FOR TREATING HETEROGENEOUS WASTE TO PROVIDE A HOMOGENEOUS FUEL

[75] Inventors: Jack D. Warf, Manassas, Va.; John J. Limbach, deceased, late of Warrenton, Va., by Francis Cecilia Limbach, executrix

[73] Assignee: Modular Energy Corporation, Bealeton, Va.

[21] Appl. No.: 111,462

[22] Filed: Aug. 25, 1993

[51] Int. Cl.$^6$ ............................................. C10L 5/00
[52] U.S. Cl. ..................................... 44/589; 44/605; 44/629; 210/511; 241/79.1
[58] Field of Search .................... 44/589, 605, 629; 210/259, 511, 525, 768, 770, 806, 540; 241/20, 21, DIG. 38, 79.1

[56] References Cited

U.S. PATENT DOCUMENTS

| | | |
|---|---|---|
| Re. 15,417 | 7/1922 | Beccari . |
| 1,625,133 | 4/1927 | Mohler . |
| 2,475,768 | 7/1949 | Williams et al. . |
| 2,475,769 | 7/1949 | Williams et al. . |
| 3,506,414 | 4/1970 | Skendrovic . |
| 3,568,839 | 3/1971 | Dunlea ............................ 210/152 |
| 3,595,488 | 7/1971 | Blakley et al. .................. 241/21 |
| 3,744,980 | 7/1973 | Harris . |
| 3,790,091 | 2/1974 | Law et al. . |
| 3,852,046 | 12/1974 | Brown . |
| 3,910,775 | 10/1975 | Jackman . |
| 3,961,913 | 6/1976 | Brenneman et al. . |
| 3,986,845 | 10/1976 | Hotchkiss . |
| 4,008,053 | 2/1977 | Brenneman et al. . |
| 4,026,678 | 5/1977 | Livingston . |
| 4,049,391 | 9/1977 | Marsh ............................. 44/589 |
| 4,152,119 | 5/1979 | Schulz ............................ 44/552 |
| 4,405,331 | 9/1983 | Blaustein et al. . |
| 4,445,906 | 5/1984 | Riemann et al. . |
| 4,561,860 | 12/1985 | Gulley et al. . |
| 4,596,584 | 6/1986 | Darby . |
| 4,702,746 | 10/1987 | Finch . |
| 4,822,379 | 4/1989 | Thompson . |
| 4,859,211 | 8/1989 | Moore . |
| 4,894,066 | 1/1990 | Castelli . |
| 5,141,526 | 8/1992 | Chu . |

Primary Examiner—Prince Willis, Jr.
Assistant Examiner—Cephia D. Toomer
Attorney, Agent, or Firm—R. Lewis Gable

[57] ABSTRACT

Apparatus and method are described for processing waste into a clean fuel. The waste comprises organic and inorganic portions. A float tank is filed with a liquid, e.g., water, of a selected depth. The waste is introduced into the liquid and separates into its organic portion, which floats near the surface of the liquid, and into its inorganic portion, which falls towards the bottom of the tank. The liquid depth is selected to be sufficiently large to permit the separation of the organic and inorganic portions. Then the organic and inorganic portions are removed. Sufficient liquid is extracted from the separated organic portion to provide the clean fuel. The fuel, illustratively, is formed as pellets. In a further aspect of this invention, further liquid is added to the separated organic portion to form a mixture thereof, which is pulped to provide a slurry thereof of a relatively high moisture content. Liquid is extracted by mechanical means, e.g., belt and/or screw presses, from the slurry to provide the clean fuel of a relatively low, homogeneous liquid content.

24 Claims, 7 Drawing Sheets

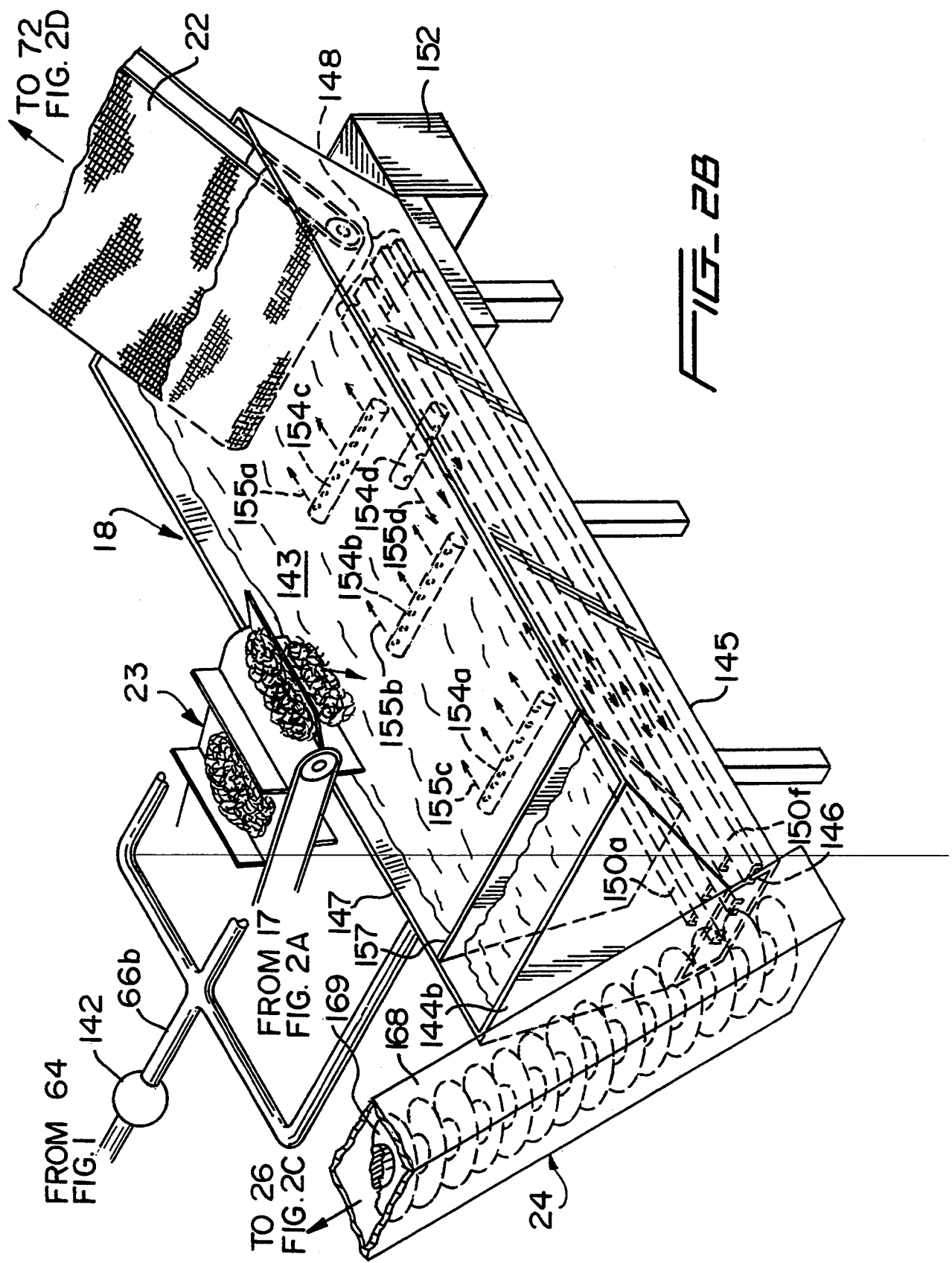

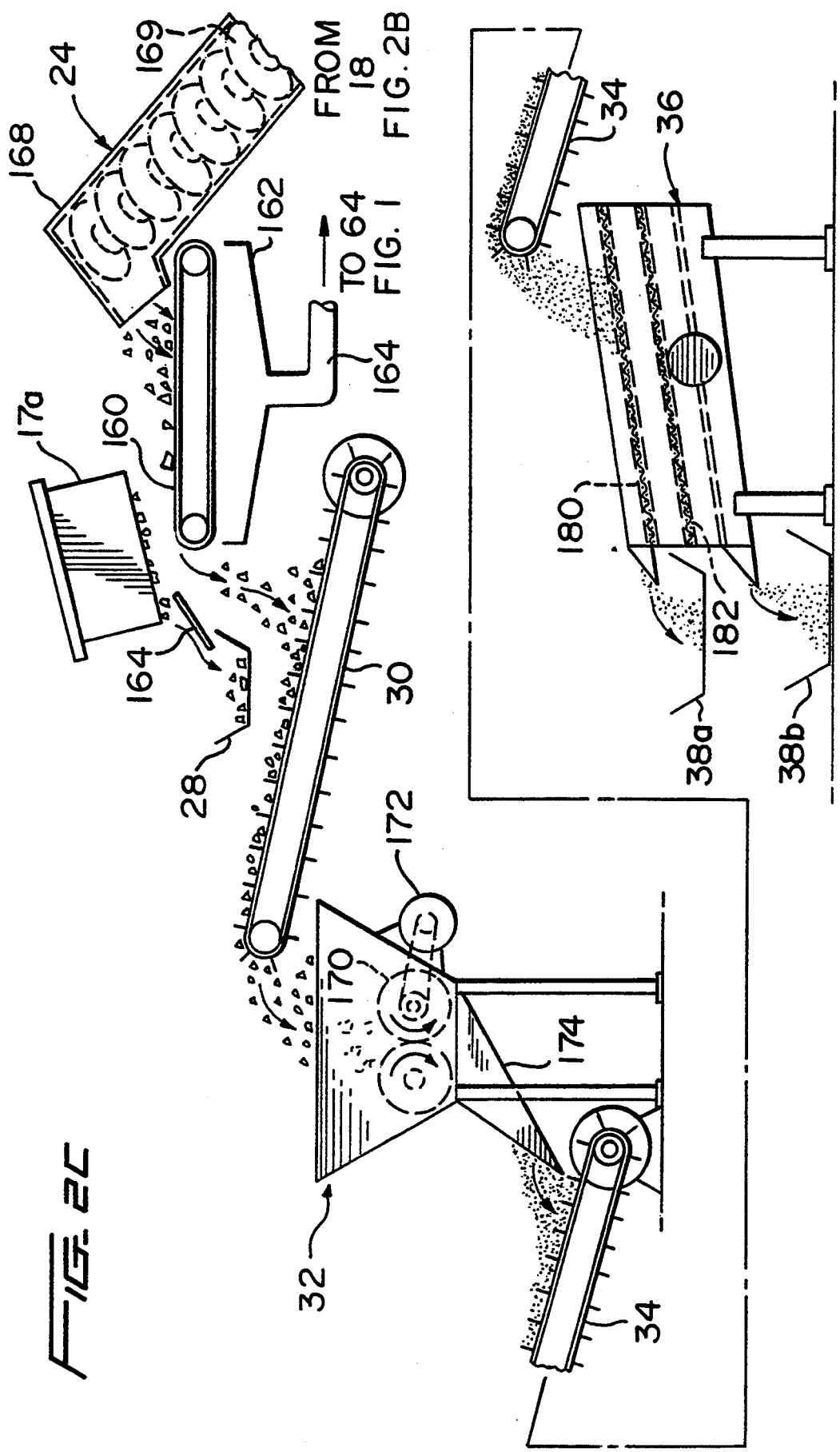

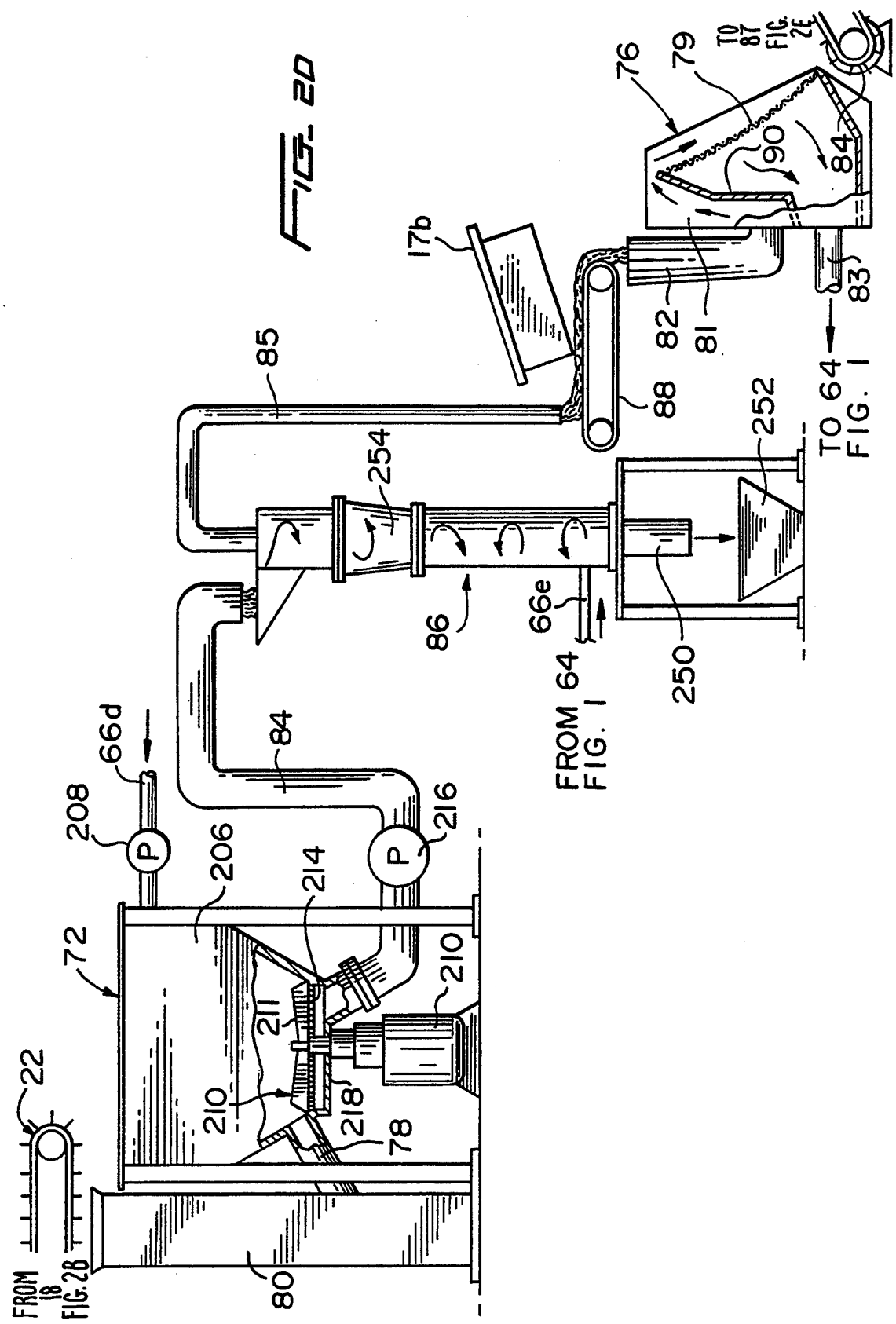

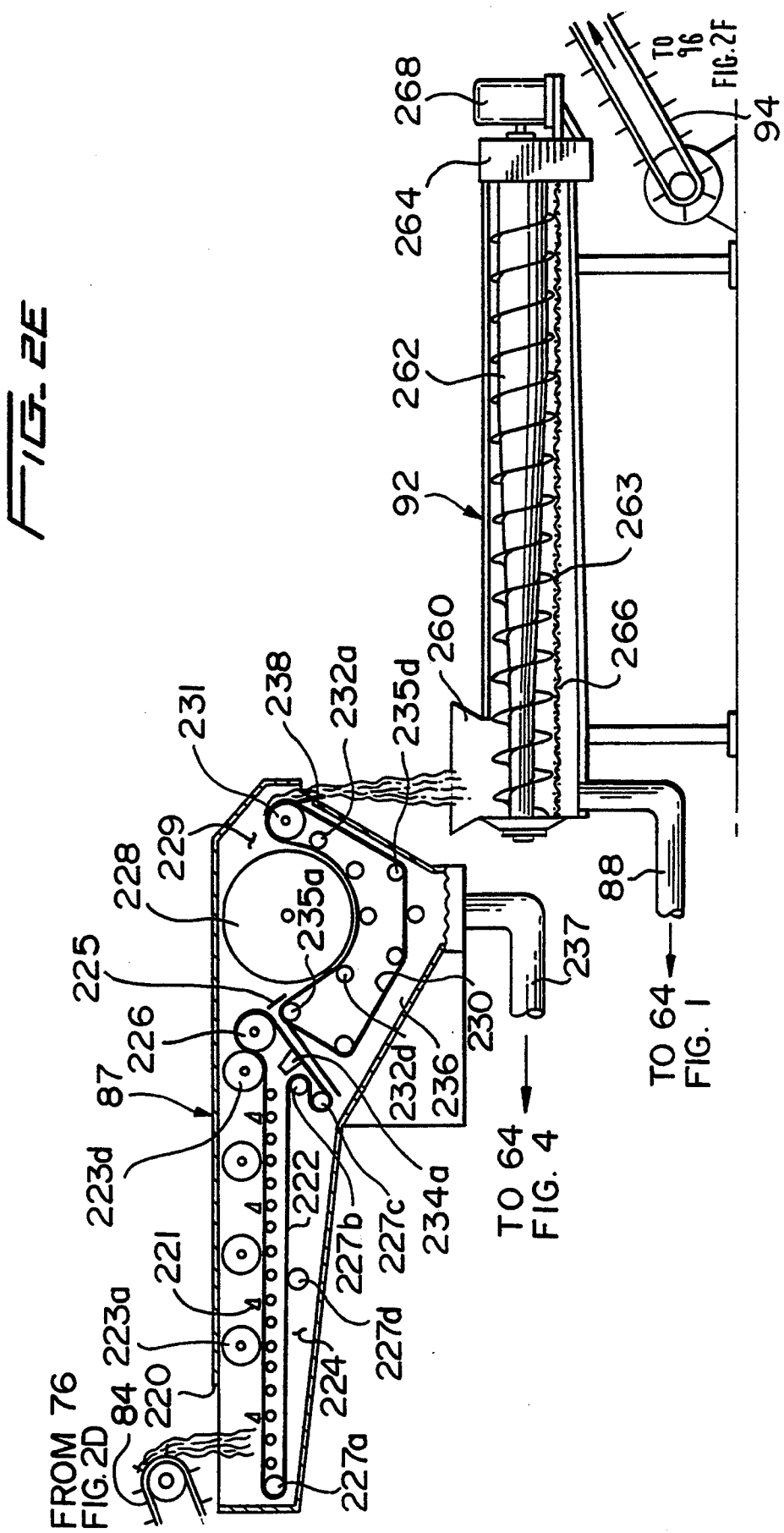

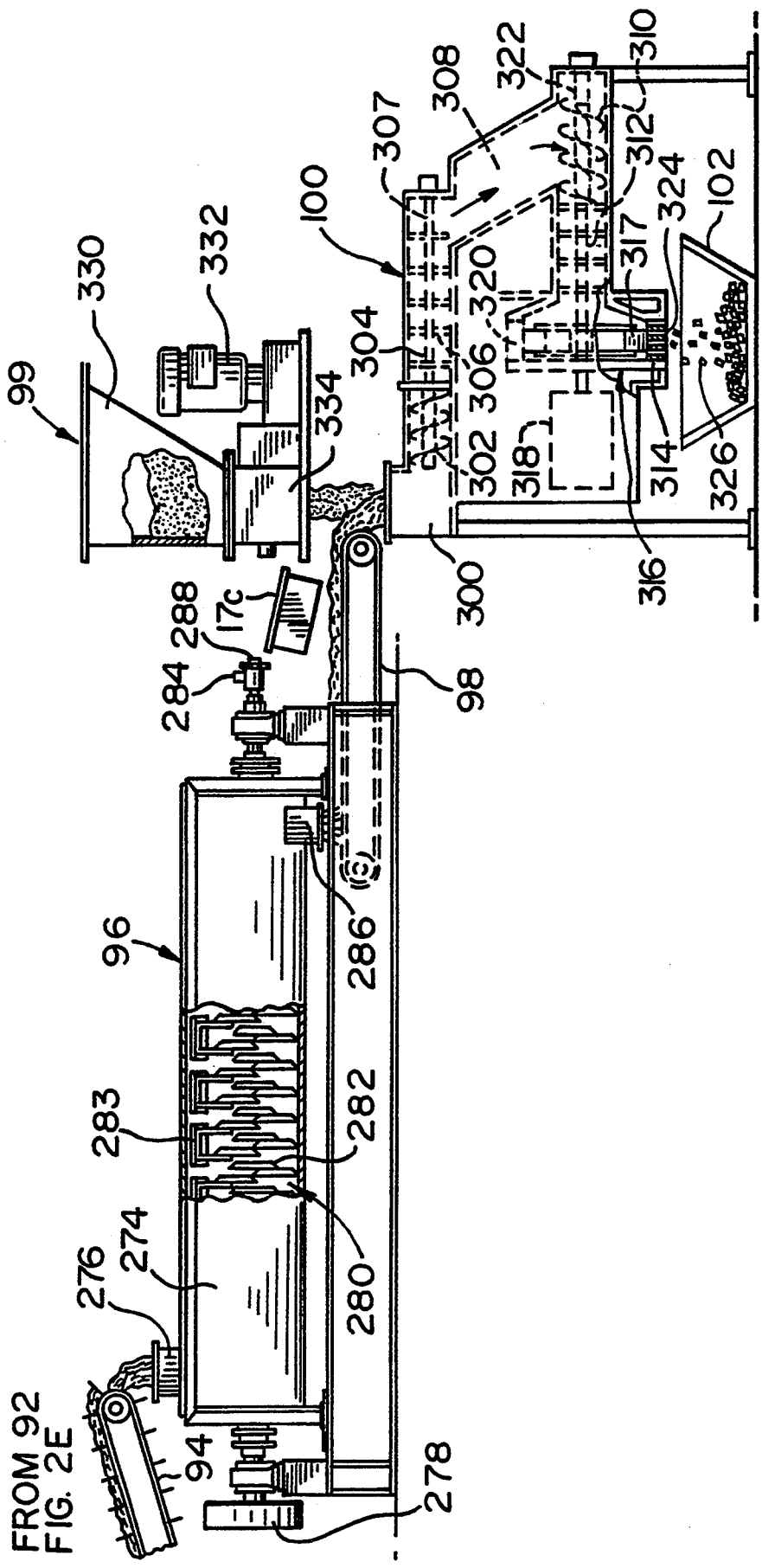

PROCESS AND APPARATUS FOR TREATING HETEROGENEOUS WASTE TO PROVIDE A HOMOGENEOUS FUEL

FIELD OF THE INVENTION

This invention relates to the process and apparatus for treating a heterogeneous waste of varying solid and moisture content, such as municipal solid waste (MSW), to provide a homogeneous fuel of a predetermined low, uniform moisture content. The fuel produced by this invention outputs when burned BTU values which are competitive to those of coal and emits particles of a character and quantity well within the limits set by environmental regulation.

BACKGROUND OF THE INVENTION

Solid waste such as MSW has traditionally presented problems of disposal which have become increasingly critical in recent years as a result of not only a rapidly increasing population but the compounding difficulty of a drastic increase in per capita production of solid waste. Conventionally, MSW has been disposed of by such means as incineration and landfill. Obviously with the ever increasing concern with problems of natural resources and the dwindling supply of acreage suitable for landfill operations within a reasonable distance of population centers, both of these methods of solid waste disposal are becoming less acceptable.

The primary strategy for disposing of MSW has been to dump it on land. In 1986 the Environmental Protection Agency (EPA) determined that more than three-fourths of all MSW was deposited in the nation's 6,000 municipal landfills. The tradition of land disposal, however, is becoming increasingly less desirable. Communities near present and proposed landfill sites have always been concerned about the reduction of property values and the smell and sight of garbage; now they also worry about physical harm to themselves from landfill gases, micro-organisms and toxins.

In response, many state environmental agencies and the EPA have legislated or proposed regulations that greatly increase standards of landfill design (and thus cost) and performance to protect people and the environment from pollutants. These regulations have closed or will soon close many landfill sites and have limited the construction of new sites.

In addition to environmental regulation, increasing costs make disposing MSW in landfills less desirable. For example, the city of Philadelphia is paying to have trash hauled as far as Harrisburg and even South Carolina at a cost $50 per ton. Increasing costs provide incentive to use alternative technologies. Most alternative solutions involve some form of burning or incineration. Traditional incineration is not an ideal solution because it is generally more expensive than land disposal and because as a consequence of the inherent nonuniformity of normal garbage, combustion is erratic such as to foster toxic fume releases.

Prodded by these incentives, attention has focused on converting MSW to a fuel, commonly referred to as Refuse Derived Fuel (RDF). Based on (Spring 1973) figures from the National Center for Resource Recovery, MSW contains a total of about 50% organic matter, in accordance with the following table:

| COMPOSITION OF MUNICIPAL SOLID WASTE | |
|---|---|
| COMPONENT | DRY BASIS |
| Glass | 9.0% |
| Ferrous Metal | 7.0% |
| Aluminum | 0.7% |
| Other Nonferrous | 0.3% |
| Paper | 32.0% |
| Textiles | 1.8% |
| Rubber | 1.0% |
| Plastics | 1.5% |
| Other Organic | 13.7% |
| Other Inorganic | 8.0% |
| Water | 25.0% |
| TOTAL | 100.0% |

The organic fraction of MSW is an important source of energy, which has an average heat value of about 8500 BTU per dry pound and an annual potential for the United States equivalent to nine billion gallons of No. 2 fuel oil. On a dry basis, its heat equivalent is about two-thirds that of Ohio coal, while its sulphur content is nil compared to low sulphur coal. Most important, it is a renewable source of energy which is readily available on a year-round basis in energy dependent urban areas.

In order to realize the potential of RDF, it must have sufficiently uniform physical and combustion characteristics to suit the specific requirements of the furnace or other burner in which it is to be used. From this standpoint, it is essential that the inorganic constituents be removed as completely and efficiently as possible from the organic fraction, so that all of the organic material can be processed to fuel while the ash content is minimized. A less obvious requirement is that there must also be complete separation of organic material from the removed inorganic fraction, since any organic material retained with the inorganic, which ultimately reach land fill, constitute a putrescible nuisance and potential hazard.

The use of RDF has met with a number of difficulties. First, a problem arises by virtue of the nature of MSW, which may consist of a wide variety of diverse materials, some of which can be used as a fuel while others cannot. Furthermore, the relatively low density of collected municipal wastes makes it impractical to handle this material for burning directly, even if this were otherwise feasible. In view of this fact, it has been known to compact or otherwise treat municipal wastes in a manner calculated to increase the usability thereof as a fuel. However, no really successful method of processing MSW on a large scale has been devised, either because processing costs are prohibitive or by virtue of the fact that the resultant product does not justify the processing expense.

Current RDF operations are typically large scale (100 ton +/hr.) costing tens of millions of dollars. The successful ones have generally required specially designed combustion equipment. In addition to high capital cost, the major problems which have plagued current and past RDF operations include:

1) High ash content fuel-causing boiler slugging;
2) Equipment failure, including explosions, from hazardous waste contamination;
3) Excessive equipment wear;
4) Nonuniform fuel burning quality, due to moisture variation;
5) Poor fuel conversion from available waste;
6) High residual waste;

7) Poor recovery of by-products; and

8) Excessive transportation cost.

RDF should have a moisture content of 10% or less to serve as an effective fuel. Thermal drying is more effective than mechanical drying techniques at relatively low-moisture levels, particularly with MSW of high paper content. Appreciating that mechanical extraction of water requires only 10% or less of the energy of thermal (evaporation) removal, there is a reluctance to add water during the processing of MSW to produce low-moisture RDF. As a result, many of the present commercial RDF operations are dry process, use air floatation for nonferrous inorganic (grit) separation, and usually do not provide for a separate drying operation to yield uniform moisture content.

The burning of RDF results in emissions which are passed into the atmosphere. The nature and quantity of such emissions are subject to state and federal regulations, e.g., the Clean Air Act as enforced by the Environmental Protection Agency (EPA). The Clean Air Act regulates the emission of heavy metals and NOx-SOx. The burning of raw, unprocessed MSW requires the use scrubbers such as electrostatic precipitators to bring emissions within the limits set by of the Clean Air Act. Such apparatus is costly to install and to operate. The EPA imposes monetary damages on industries, e.g., electric utilities, which fail to meet the limits of the Clean Air Act. These damages are defined in terms dollars per ton of pollutants. Thus, an industry which emits so many tons of pollutants in excess of the limits, must pay a fine based on the excess tons. Conversely, those industries, which burn fuel with pollutants less than the limits, will receive credits based on the difference between the limits and the emitted tons. These credits are bought and sold on the Chicago Board of Trade. Thus, industries burning clean fuel may realize income by selling its credits, whereas polluters must buy credits to burn its relatively dirty fuels.

U.S. Pat. No. 3,506,414 of Skendrovic is an example of a process for producing RDF without the introduction of water. Skendrovic discloses a system for transforming municipal refuse and garbage into a low-grade fuel. Refuse and garbage are collected and placed in a feed hopper which distributes it through a separator-disintegrator. The separator-disintegrator reduces the top size of the refuse and garbage and simultaneously dewaters the refuse and garbage. From the separator-disintegrator, the refuse and garbage pass through a metal separator to remove ferrous metals therefrom. The refuse and garbage are then passed through compressive rollers to exert a compressive force thereon, and to squeeze water therefrom. An extruder forms the dewatered material into fuel pellets.

U.S. Pat. No. 4,049,391 of Marsh discloses the depositing of MSW into a treatment vessel with water and subjecting such a mixture to mechanical and hydraulic shear forces to produce a slurry. Such a slurry is subsequently processed by a liquid cyclone and a mix tank, before being dewatered by a screw press and a cone press. The partially dried product of the cone press is finally dried by a thermal dryer. It is apparent that most of the water removal is performed by the thermal dryer in that according to Marsh, "It is not practically feasible to dewater the slurry mechanically to a higher solids content than about 50%."

SUMMARY OF THE INVENTION

It is an object of this invention to produce a clean and homogeneous RDF with uniform moisture content.

It is a further object of this invention to provide a new and novel process and apparatus for producing RDF, which require no or minimal thermal water removal to produce a dry RDF, but rather rely for the majority of drying on mechanical water removing whereby improved moisture uniformity of the RDF is obtained.

It is a still further object of this invention to provide a new and novel process and apparatus for adding water to the MSW to effect a cleaning of and a separation of the organic components from the inorganic components of the MSW.

In accordance within these and other objects of this invention, there is described an apparatus and a method for processing waste into a clean fuel. The waste comprises organic and inorganic portions. A float tank is filed with a liquid, e.g., water, of a selected depth. The waste is introduced into the liquid and separates into its organic portion, which floats near the surface of the liquid, and into its inorganic portion, which falls towards the bottom of the tank. The liquid depth is selected to be sufficiently large to permit the separation of the organic and inorganic portions. Thus, the organic and inorganic portions are removed. Sufficient liquid is extracted from the separated organic portion to provide the clean fuel.

The fuel, illustratively, is formed as pellets.

In a further aspect of this invention, further liquid is added to the separated organic portion to form a mixture thereof, which is pulped to provide a slurry thereof of a relatively high moisture content. Liquid is extracted by mechanical means, e.g., rollers and/or screw passes, from the slurry to provide the clean fuel of a relatively low, homogeneous liquid content.

BRIEF DESCRIPTION OF THE DRAWINGS

A written description setting forth the best mode presently contemplated for carrying out the present invention and of the manner for implementing and using it, is provided by the following detailed description of an illustrative embodiment of this invention in one or more of the following drawings:

FIGS. 2A–F are interconnected drawings showing pictorially the equipment shown generally in FIG. 1 and how the process of this invention proceeds from one piece of equipment to the next.

DESCRIPTION OF A PREFERRED EMBODIMENT OF THIS INVENTION

Figure 1:
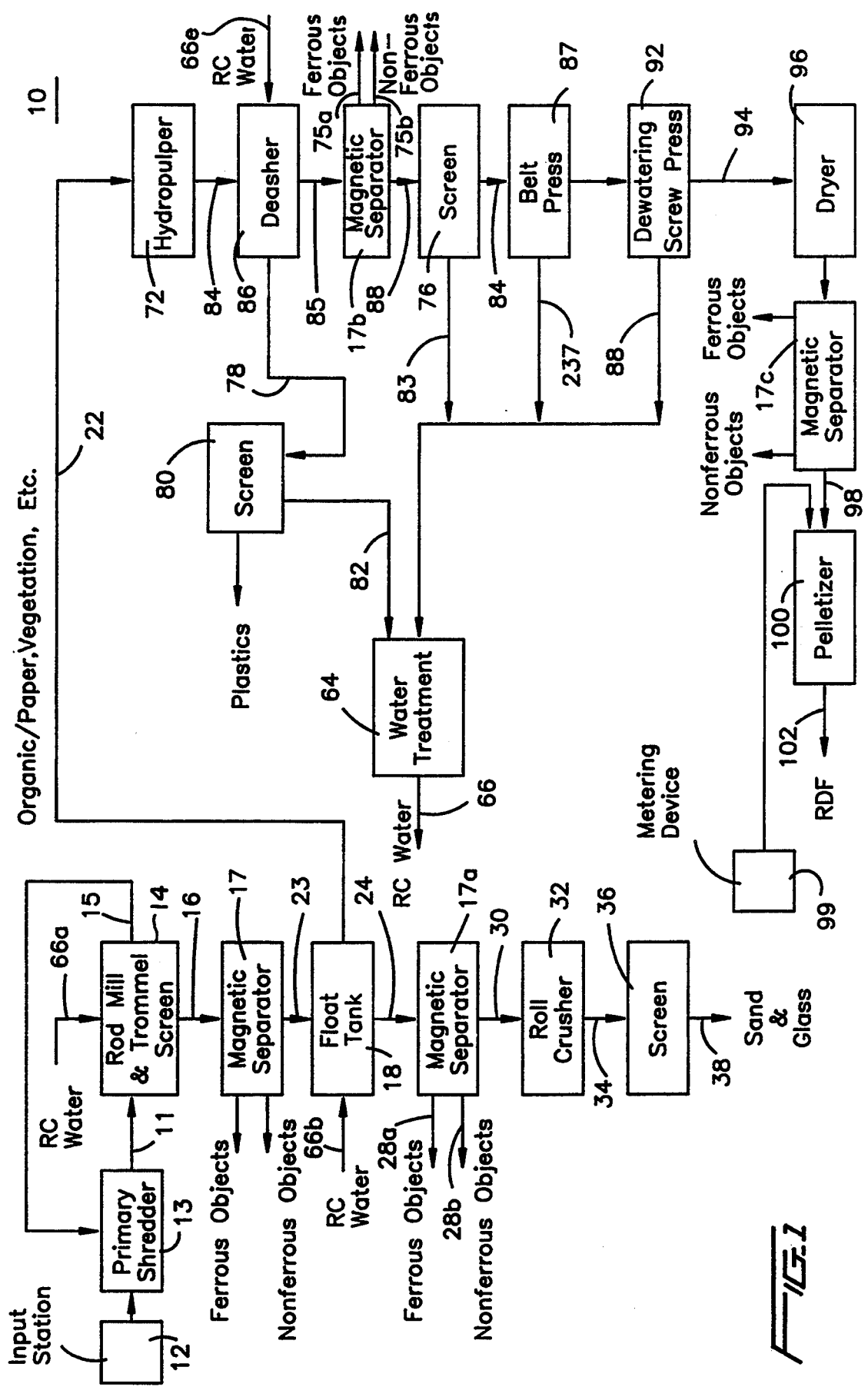
FIG. 1 is a functional block diagram of the equipment which comprises the apparatus for carrying out the steps of the process in accordance with the teachings of this invention.

Referring now to the drawings and in particular to FIG. 1, this invention is illustrated as a waste treatment apparatus 10 for receiving and treating waste, and in particular MSW to produce RDF. Apparatus 10 comprises a waste input station 12 for receiving the MSW before it is introduced into a primary shredder 13, which imparts the initial size reduction to the introduced MSW. The output from the shredder 13 has a size of limited dimension, e.g., 4 to 10 inches. Further the shredder 13 rips open the plastic bags, which are used to receive and transport waste. The shredder output is discharged onto a conveyer 11, which transports the shredded waste to a rod mill and trammel screen 14. A conduit 66a from a water treatment station 64 introduces recycled water along with the waste into the rod mill and trammel screen 14. As will become clearer from the discussion below, water is used in many of the components of the apparatus 10 and, after use, is recycled to the water treatment station 64 to be cleaned, before being distributed by one of the conduits 66 and used again in various of the components of the apparatus 10. The water serves to wash the MSW and ultimately to provide a cleaner RFD, as well as to facilitate screening of the waste. The rod mill and trammel screen 14 separate oversize objects of a dimension greater than a preset limit, e.g., 4 to 10 inches, and returns such objects via an output 15 to the shredder 13 to again be shredded. The smaller objects of the MSW/water mixture are discharged on to a conveyer 16, which transports these objects to a magnetic separator 17. The magnetic separator 17 removes ferrous and nonferrous metals from the MSW, before it is introduced into a float tank 18.

The waste conveyed from the rod mill and trammel screen 14 is introduced into the float tank 18 along with recycled water via conduit 66b. The content of the MSW introduced into the tank 18 comprise generally organic and inorganic components as described above. A portion of the inorganic component comprising ferrous and nonferrous objects has been removed by the magnetic separator 17. As will be described below in greater detail, the recycled water is directed via a return conduit 66b under pressure and introduced as a jet within the float tank 18 to encourage the mixing of the waste and water. The water agitation and swirling encourages a cleaning or scrubbing of the waste before it is further processed. The cleaned waste results in a cleaner fuel, which when burned will introduce fewer contaminants into the atmosphere. The reduction of emissions from the burnt RFD will be described in detail below. The float tank 18 also separates the relatively heavy, organic components of the waste such as glass, and ferrous and nonferrous metals, from the relatively light, organic components. The relatively heavy, inorganic components settle to the bottom of the float tank 18, where they are removed and transferred by a screw type conveyer 24 to a magnetic separator 17a. The relatively light, organic components of the waste such as paper, plastic, cloth, vegetation etc., rise or "float" to the surface of the water within the float tank 18, where they are removed with aid of the jets of the recycled water onto a conveyer 22 which carries the cleaned, organic components to a hydropulper 72 for further treatment.

The conveyer 24 transports the inorganic components including ferrous and nonferrous metal objects beneath the magnetic separator 17a. The magnetic separator 17a is energized to attract and extract the ferrous and nonferrous metal objects from the rest of the inorganic waste. The magnetic separator 17a discharges the ferrous and nonferrous metal objects respectively to outputs or bins 28a and b, while the remaining inorganic waste is transported by a conveyer 32 to a roll crusher 32. The separated ferrous metal objects are readily saleable as scrap iron.

The roll crusher 32 breaks or "crushes" the frangible components of the remaining waste, namely glass, silica and stone, into particles of a selected size depending on what materials are required or may be sold. The crushed glass particle as well as the remaining waste are transported by a conveyer 34 to a screen 36 with relatively small openings of the selected size, to permit the crunched glass and sand to pass therethrough and be collected at output 38.

The organic waste, which was separated by the float tank 18, is transported by the conveyer 22 to the hydropulper 72. Recycled water is also introduced via a return conduit 66e into the hydropulper 72. As will be further explained with respect to FIG. 2D, the hydropulper 72 includes a rotor 210 which is driven at relatively high speeds to reduce a strips of organic waste, namely paper or wood materials, to individual fibers or fiber bundles.

The resulting slurry of water and cellulose fibers is pumped via a conduit 84 to a deasher 86, which removes ash from the fibrous slurry before outputting the slurry via a conduit 85 to a magnetic separator 17b. The separator 17b, which is similar to the separator 17, removes and separates the ferrous and nonferrous objects respectively into bins 75a and b. The iron removed by the magnetic separators 17a and 17b has a marketable value. Excess or loose water flows through the screen 76 to be collected and conveyed via a return conduit 83 to the water treatment station 64. As noted above, the treatment station 64 purifies the process liquid to a degree that it may be continuously recycled. The purified liquid, e.g., water, is returned via conduits 66 to various points in the process, e.g., the rod mill and trammel screen 14, the float tank 18, and the hydropulper 72. The water treatment station 64 permits the continuous recycling of water so that no water is discharged and potential pollution of the environment is eliminated.

The dewatering screen 76 discharges the fibrous slurry, discharged onto a conveyer 84, which transports the slurry to a belt press 87. The belt press 87 is a first of two series stages of a mechanical drying process, the second stage comprising a screw press 92. The first or belt press 87 removes and returns water from the slurry via a conduit 237 to the liquid treatment station 64. The partially dried slurry is discharged into the second or screw press 92, wherein a significant amount of the liquid or water content of the fibrous slurry is removed therefrom, collected and returned via a conduit 88 to be purified by the water treatment station 64 as discussed above.

Optionally, the dewatered fibrous slurry is transported by a conveyer 94 to a thermal dryer 96 to further reduce the moisture content of the fibrous slurry. The relatively dry fibrous slurry may then be fed by a conveyer 98 past a magnetic separator 17c, similar to the separator 17, for the removal of ferrous and nonferrous objects. The conveyer 98 discharges the dried waste into a pelletizer 100, which further drys the waste and extrudes it under pressure through a die, as will be explained with respect to FIG. 2F, to produce RDF pellets at a fuel output 102. A metering device 99 is disposed to introduce further materials into the pelletizer 100, which are mixed thereby to form the pellets. For example, the further materials may include Calcium Hydroxide (lime) to suppress the emission of pollutants when the pellets are burned and/or a binder to hold the pellets together and to improve their storage life. The device 99 controls or meters the amounts of the materials to be introduced. For example, it is desired to keep the percentage of lime to that minimum amount that will suppress pollutant emissions, e.g., 3% by weight. Further, the introduction of lime and/or binder material, which have a water content in the order of 4–6%, may be controlled by the device 99 to further effect the resulting moisture content of the pellets.

RDF, whether in pellet form or not, should preferably have a water content of 10% or less to burn efficiently. The waste treatment apparatus 10 of this invention relies on mechanical rather than thermal water removal means, for the primary reason that, depending on the specific moisture concentration level of the starting slurry to be dried, mechanical extraction of water requires 10% of the energy required for thermal (evaporation) removal. Actual processing has demonstrated that the mechanical screw press 92 is capable of reducing the water content to at least 40%. Even without the thermal dryer 96, the pelletizer 100 is capable of further reducing the water content of RDF pellets produced thereby. If the pelletizer 100 is used, the thermal dryer 96 needs only to reduce the water content from 40% to 20%, while relying on the mechanical action of the pelletizer 100 to reduce the moisture content from 20% to the produced RDF pellets of a moisture in the range of 8 to 10%, which is exceptionally dry for a solid fuel. Thus the use of the more expensive thermal water removal in terms of required energy is not required, and the moisture content of the RDF pellets is reduced to as low as 5%.

The RDF produced by the waste treatment apparatus 10 of this invention is dry (10% or less moisture content) and clean. Dry RDF will burn efficiently and evenly. Clean RDF will burn with a minimum of pollutants introduced into the atmosphere. The apparatus 10 operates by a process analogous to a wet laundry as would include the steps of scrubbing and rinsing as carried out by the float tank 18 and the hydropulper 72, spin drying or roller squeezing by the dewatering belt press 87 and/or the screw press 92 and, optional, evaporation dryer by the thermal dryer 96. Further, the processing imparted to the fibrous slurry by the hydropulper 72, the belt press 87, the screw press 92 and the pelletizer 100 insures an uniformly distributed water content throughout the produced RDF.

RDF pellets produced by the waste treatment apparatus 10 of this invention can be used in any conventional coal burning equipment with no loss of capacity and a cleaner (no sulfur), more uniform operation. To be energy competitive, market acceptance of the RDF pellet should require only a direct energy content vs. price adjustment. Based on an energy content of 16 million BTU per ton of the RDF pellets and 25 million BTU per ton of coal, the price of the RDF pellets to compete with $50/ton coal, should be $32 per ton. These RDF pellets could be sold off-site or consumed on-site for electric power generation.

Figure 2A:
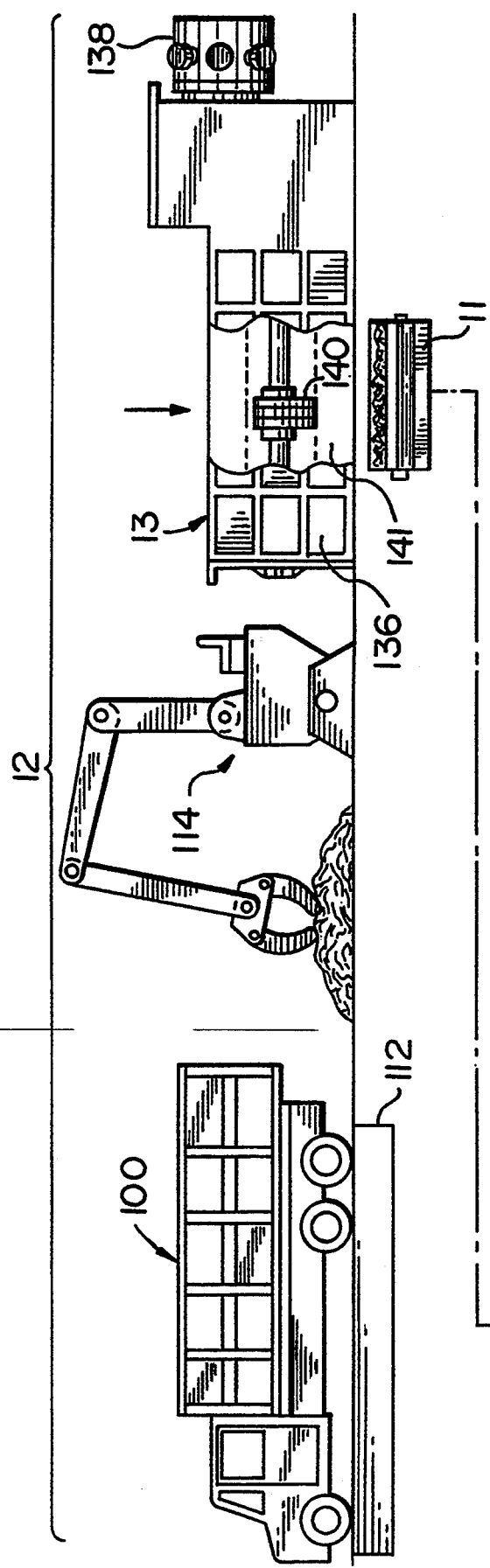
Figure 2A:
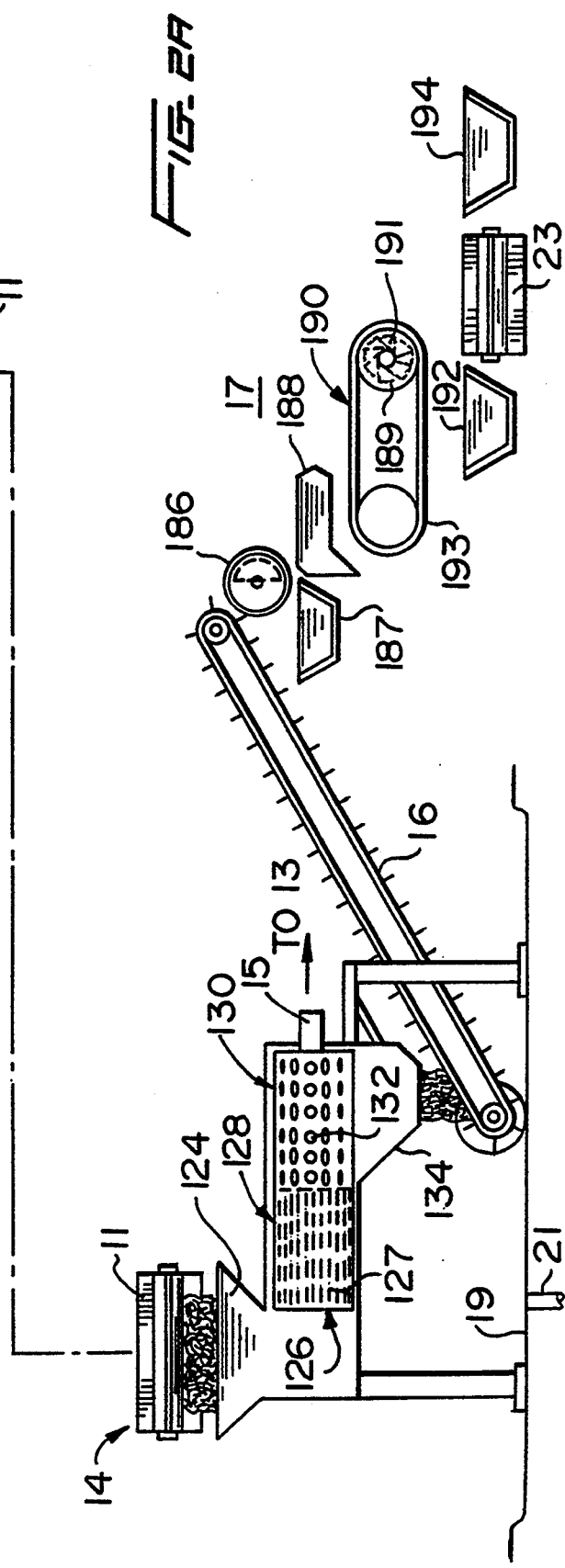

The waste treatment apparatus 10 will now be explained in greater detail with respect to FIGS. 2A–F. Referring first to FIG. 2A, there is shown a garbage truck 110 bringing a further load of MSW to the waste input station 12, which includes a scale 112 for weighing both the MSW and the truck 110 whereby the weight of the MSW may be determined by taking the difference between the total, measured weight and the known weight of the truck 110. After the truck 110 has unloaded its MSW, a front end loader 114 delivers the MSW into a tank 136 of the shredder 13, which further includes a plurality of cutters 140 driven rotatively by a hydraulic motor 138 in opposite directions to shred the MSW. In an illustrative embodiment of this invention, the scale 112 may take the form of that "Steel Bridge II Flat Top Truck Scale" as manufactured by Weigh Tronix, Inc. The loader 114 may illustratively take the form of a 1600 Industrial Crane as manufactured by Barko Hydraulics. The shredder 13 may take the form of that Model 72 - 46 HT Shredder as manufactured by the Saturn Shredders Division of the MAC Corporation. The shredded waste is discharged from the shredder 13 through its output port 141 onto the conveyer 11, which transports the shredded waste into an input hopper 124 of the rod mill and trammel screen 14.

The rod mill and trammel screen 14 rotatively supports therein a rotatable tumbler 126 for receiving therein the waste introduced into its hopper 124. The tumbler 126 includes a first forward section 128 and a second rearward section 130. The first section 128 has a plurality of ribs 127, which are mounted on the inner periphery of the tumbler 126 in parallel orientation to the axis of the tumbler 126. The first section 128 may also include within its first 10 feet spikes and a chain breaker (not shown), which act together with the ribs 127 to break open garbage bags within the received waste. The second, trammel section 130 has a plurality of openings 132 evenly distributed about its surface. The openings 132 are of a diameter, e.g., 4 to 10 inches, selected to permit the waste to be directed under centrifugal force therethrough and to be discharged through a chute 134 onto the conveyer 16, which transports the waste to the magnetic separator 17. The conveyer 16 is made of a screen with openings, which permits lose water to drain from the waste. The rod mill and trammel screen 14 and the conveyer 16 are installed within a basin 19, which permits the water draining from the waste to be collected and returned via a conduit 21 to the water treatment station 64. The oversized objects within the waste, which can't pass through the openings 132, are discharged through the output 15 and are returned to the primary shredder 13 to be reshredded. The rod mill and trammel screen 14 may illustratively take the form of a Mobile Drum Debarker as manufactured by Price Industries, Inc.

The conveyer 16 transports the MSW to the magnetic separator 17, which comprises a magnetic drum 186, which is rotated to separate ferrous or iron objects from the MSW and to dispose them into an iron bin 187, and a vibratory feeder 188 which feeds the MSW less the iron removed by the drum 186 to an eddy current separator 190. The separator 190 is comprised of a external drum 189, an internal rotor 191 and a belt 193 which is driven by the drum 189. The drum 189 is made of non-metallic components and is rotatively driven at a relatively slow speed. The internal rotor 189 is made of a rare earth and is rotated at a higher rotational velocity than the drum 189, whereby eddy currents are induced in the nonferrous materials whereby the alternating magnetic field established by the drum 189 repels and separates the nonferrous metals from the MSW and the ferrous objects. Any remaining ferrous metal objects are selectively disposed to an iron bin 192, nonferrous metal objects to a nonferrous bin 194 and the MSW to the conveyer 23, which transports it to the float tank 18. In an illustrative embodiment of this invention, the magnetic separator 17 may take the form that a Permanent Rare Earth Eddy Current Nonferrous Metal Separator as manufactured by Eriez Magnetics.

As shown in FIG. 2B, the conveyer 23 brings the waste to the float tank 18. The tank 18 is of sufficient dept to permit separation of the inorganic materials of the MSW, which have settled to the bottom of the tank 18, from those organic components which float near or on the surface of the tank water 143. Illustratively, the tank 18 may be dimensioned to hold 5,000 to 10,000 gallons of water. As shown in FIG. 2B, the cross-section of the tank 18 is V-shaped, whereby a floor 145 of the tank 18 has a smaller dimension along its width than a mouth 147 of the tank 18. The tank 18 has end walls 144 a and b disposed at opposite ends. A conveyer in the form of a live floor system 148 is mounted on the floor 145 for transporting the inorganic waste to left as seen in FIG. 2B. It is under stood that the V-shape of the tank 18 guides the inorganic waste onto the live floor system 148 as it sinks to the tank floor 145.

The float tank 18 and the other components of the waste treatment apparatus 10 are dimensioned to handle a given weight of MSW per day. A float tank 18 having 15,000 gallon capacity could process 200 tons of MSW per day. The size and speed of the conveyer 23 are set to transport 15 tons of MSW per hour to the tank 18. For MSW of a components as described above, approximately 50 to 60% of the MSW is organic and is moved to the right as seen in FIG. 2B by a swirling currents established in the tank water 143. In particular, recycled, purified water is pumped by a pump 142 from the water treatment station 64 via conduit 66b and is introduced by a plurality of fluid nozzles 154a, b, c and d. Each nozzle 154 has a plurality of openings 156, which introduce the water as jets into the float tank 18 at a high rate, e.g., 2083 gpm, and pressure, e.g., 5 psi. The nozzles 154a, b and c are disposed just below the floating organic waste at a depth within the liquid 143 of 6 to 10 inches and their openings 156 direct jets of water towards the end wall 144a as indicated by the arrows 155a. At least one nozzle 154d is disposed at a greater depth of 18 inches within the liquid 143 and its openings 156 direct jets of water in the opposite direction (to the left) as indicated by the arrows 155d towards the end wall 144b. The jets of water causes the water 143 within the float tank 18 to swirl, whereby the floating organic waste is swept to the right and the sunken inorganic waste is moved to the left, as seen in FIG. 2B. One end of the conveyer 22 is disposed within the float tank 18 to receive and to transport the organic waste to the hydropulper 72 as shown in FIG. 2D.

The live floor system 148 comprises a plurality of cross members 150a, b, c, d, e and f, each of which extends along the long dimension of the float tank 18. Each member 150 is mounted for and is driven rectilinearly by a drive system 152, which comprises a hydraulic pump and a suitable drive transmission (not shown). In operation, alternate cross members 150 are driven to the left as shown in FIG. 2A, while the adjacent members 150 (intermediate of the driven cross members) are lowered and retracted to the right. Next the adjacent members 150 are driven to the left, while the previously driven members 150 are lowered and retracted to the right. As the members 150 are so moved, the inorganic waste, which has sunk to the bottom of the float tank 18 to rest on the cross members 150, is moved to the left towards an output opening 146. In an illustrative embodiment of this invention, the live floor system 148 may comprise an "East Unloader" as manufactured by the East Manufacturing Corporation. A baffle 157 is disposed towards and is spaced from the end wall 144b of the float tank 18. The baffle 157 extends from the upper opening 147 downward towards the floor 145 to prevent the floating organic waste from being drawn through the opening 146. A passage way is provided between the bottom of the baffle 147 and the live floor system 148 to permit the passage of the sunken, inorganic waste to the output opening 146.

As the inorganic waste is transported to the output opening 146, the screw conveyer 24 directs the waste onto a conveyer 160, as shown in FIG. 2C. The conveyer 24 comprises a conduit 168 and a helically shaped screw 169, which is rotatively driven by a suitable motor to transport the inorganic waste upward as seen in FIG. 2B.

As shown in FIG. 2C, the screw conveyer 24 transports the mixture of water and inorganic solid waste onto a screen conveyer 160, which has relatively small openings, e.g, 5/64 inch diameter, to permit water but not the solid waste to pass therethrough. A water drain 162 is disposed beneath the screen conveyer 160 to catch the water and to return it via a conduit 164 to the water treatment station 64. A magnetic separator 17a is disposed above the screen conveyer 160 and, as the conveyer 160 moves the inorganic solid waste thereby, the separator 17a is energized to attract ferrous and nonferrous objects therefrom. The magnetic separator 17a is de-energized during off time, whereby the ferrous objects are released therefrom to fall onto a chute 164 which directs the ferrous objects into the iron bin 28. The magnetic separator 17a may take the form of that magnetic separator 17 as described above in detail with respect to FIG. 2A.

The inorganic solid waste less the removed ferrous and nonferrous objects falls from the screen conveyer 160 onto the conveyer 30, which transports it to the roll crusher 32. The crusher 32 includes a pair of rollers 170, which are driven by a motor 172 in opposite directions as shown in FIG. 2C to force the waste therebetween and to crush therebetween the frangible objects, primarily glass. The crushed waste is discharge through a chute 174 affixed to the bottom of the crusher 32, onto the conveyer 34. The roll crusher 32 may illustratively take the form of a model HMG-40 Glass Crusher as manufactured by C. S. Bell Company.

The conveyer 34 transports the crushed waste, which primarily comprises sand, glass, and dirt, to the vibrating screen 36. The vibrating screen 36 includes upper and lower screen decks 180 and 182 mounted one above the other as shown in FIG. 2C. The screen decks 180 and 182 are suspended resiliently to permit vibration, when driven by a motor 184 through a suitable belt coupling. The upper screen deck 180 has relatively larger, coarse openings, e.g., ½ inch diameter, compared to the openings of the lower deck 182, e.g., ⅜ inch. Thus, the upper screen deck 180 will extract the small waste objects, e.g., glass, plastic, and any remaining metal objects, which will be discharged into the bin 38a. The lower screen deck 182 separates rocks, which are discharged into the bin 38b. The relatively smaller residue, which passes through the lower screen deck 182, is comprised primarily of glass and sand. In an illustrative embodiment of this invention, the vibrating screen 36 may take the form of a model TY-ROCKET-E Vibrating Screen as manufactured by Combustion Engineering, Inc.

As shown in FIG. 2D, the conveyer 22 transports from the float tank 18 the organic waste to the hydropulper 72. The waste introduced into the hydropulper 72 illustratively comprises by weight 80–90% organic materials and 10–20% inorganic materials. The float tank 18 effectively separates organic and inorganic wastes, but some inorganic waste will be included within the organic waste transported to the hydropulper 72. Typically, the inorganic portion includes 0.5–1% silicon, dirt, textiles and plastic. The larger organic component comprises paper, wood, food, and lawn and garden debris. The hydropulper 72 includes an open mouthed hopper 206 to receive the organic waste transported by the conveyer 22. A rotor 210 is rotatively mounted at the bottom of the hopper 206 and is driven at a relatively high speed. Illustratively, the hopper 206 may be of a cylindrical configuration with a diameter of 30 feet and a height of 8 feet. The rotor 210 further includes a plurality of blades 211, each of which extends radially from the rotor center. Recycled water is forced by a pump 208 via the conduit 66d from the water treatment station 64 into the hydropulper 72. Basically, the hydropulper 72 converts the organic waste received from the float tank 18 into a slurry of water and pulverized organic waste. Primarily, the hydropulper 72 functions to clean the organic waste by agitating and scrubbing it; in this regard, the high speed rotation of the rotor 210 effectively agitates and scrubs the waste. Secondarily, the hydropulper 72, as will be described, further reduces the organic waste to a relative uniform size, e.g., 0.25 to 1 inch diameter. Of significance particularly with respect to RDF, the hydropulper 72 ensures the uniform moisture content throughout the RDF pellets to be made by the pelletizer 100 and, thus, an efficiently and uniformly burning fuel. In particular, the mechanical action of the rotor blades 211 serves to breakup the waste and, in particular, the large pieces thereof. The rotor 210 is mounted immediately above a screen 214, which has a plurality of openings therethrough evenly spaced about its surface. As the waste is forced between the rotor 210 and the screen 214, relatively large shear forces are imposed on the waste. Finally, the rotatively driven rotor 210 produces forces within the water, which produces hydraulic (fiber to fiber) shear on the waste. As the waste is further reduced in particle size, the resultant slurry is forced through the screen 214 and a collection chamber 218 into the conduit 84. The essentially organic waste discharged into the conduit 84 is a substantially uniform mixture of water and pulp with a relatively high moisture content, e.g., 80 to 90%. The screen 214 has openings therethrough of a size, e.g., ⅜ inch, to prevent any inorganic waste to pass. The inorganic waste particles are trapped by the screen 214 and are discharged by the rotor 210 via a conduit 78 into a junk box 80. The hydropulper 72 may illustratively take the form of the Hydropulper manufactured by The Black Clawson Company.

The slurry of high moisture content outputted by the hydropulper 72 is forced by a pump 216 via the conduit 84 to the deasher 86, which removes most of the grit remaining in the waste. Illustratively, the grit of interest comprises mostly glass and a lesser portion of dirt. Though only a single deasher is shown in FIG. 2D, it is understood that more than one deasher 86 could be connected in series with each other; the number of deashers 86 required depends upon the tonnage of MSW to processed per day by the waste treatment apparatus 10. Recycled water from the water treatment station 64 is introduced via the conduit 66e. As indicated by the arrows, the slurry is driven in a downward helical motion by an internal pump (not shown), whereby the ash is forced outwardly to the inner walls of a cone 254 and carried downwardly to be discharged through a chute 250. The deasher 86 separates the grit from the slurry dependent on the difference in the specific gravities of these materials. Since, grit has a higher specific gravity than the pulp, the grit falls via the shut 250 into a grit bin 252. The collected grit is particularly clean and has a ready market for use as a component of asphalt or as a land fill. At the bottom of the deasher 86, the slurry is reflected by the bottom of the cone 254 to flow upwardly along its axis to be discharged via conduit 85. The deasher 86 may illustratively take the form of the "Liquid Cyclone" Centrifugal Cleaner as manufactured by the Black Clawson Company.

The conduit 85 discharges the slurry onto a conveyer 88, whereby it is transported beneath the magnetic separator 17b, which is basically similar to the separator 17 described above in detail with respect to FIG. 2A. The magnetic separator 17b is continuously energized to remove any ferrous and nonferrous objects, which were not separated from the organic waste by the float tank 18.

The conveyer 88 transports the waste/water slurry to the static screen 76 and introduces it by gravity feed via an input conduit 82 into a headbox 81 thereof. The slurry overflows a weir 90, cascading down over a screen 79, which is parabolically shaped and comprises a first, upper section of a 26 degree slope and a second, lower section of a 45 degree slope. Most free water is removed from the slurry on the first section. More water is removed on the second, lower section, while the solid components of the slurry roll on the second section thus deaccelerating before being discharged onto the conveyer 84. Water passing through the screen 79 is collected in the bottom of the headbox 81, before it is returned via the conduit 83 to the water treatment station 64. The screen 76 may illustratively take the form of the "Hydrasieve" Screen as manufactured by Sprout-Bauer, Inc.

The conveyer 84 transports the slurry less most of the free water to the belt press 87, which effects the first stage of mechanical dewatering. The slurry is introduced via an input opening 220 into a first or low pressure zone 224. In particular, the slurry is distributed evenly onto a low pressure dewatering belt 222, which is made of a screen to facilitate gravity drainage. The belt 222 is driven clockwise as shown in FIG. 2E by a driver roll 226, which is in turn rotated by a motor (not shown). The belt 222 is further suspended by a plurality of support rolls 227a–d. The slurry is transported to the right over a series of blades 221, which plough and overturn the slurry to release more free water. As the slurry moves to the right, it is also subjected to the gradual dewatering of a series of dewatering rolls 223a–d, whose pressure may be adjustably set. The partially dewatered slurry is removed from the first belt 222 by a doctor blade 225 and is fed into a second or high pressure zone 229 and onto a second or high pressure dewatering belt 230. The belt 230, which is illustratively made of a screen, is suspended on a plurality of support rolls 235a–d to be guided between a rotatable, dewatering drum 228 and a series of belt rollers 232a–d. The belt 230 is driven clockwise by a rotatively driven roller 231. Tension placed on the belt 230 causes a uniform pressure to be exerted by it on the slurry distributed over the surface of the drum 228. The belt rollers 232a–d gradually dewater the slurry by the pressure exerted between the belt 230 and the drum 228. The slurry is subjected to a final dewatering as it is fed between the drum 228 and the driven roller 231, before the slurry is removed from the belt 230 by a doctor blade 238. The water released from the slurry in the first and second zones 224 and 229 drains by gravity into a collection chamber 236, before it is returned by the conduit 237 to the water treatment station 64. In an illustrative embodiment of this invention, the belt press 87 may take the form of that Model FPB Continuous Filter Belt Press as manufactured by William R. Perrin Co., LTD.

After being subjected to the first stage of mechanical dewatering in the belt press 87, the partially dried slurry is discharged therefrom by its doctor blade 238 into the screw press 92 and, in particular, into its input hopper 260. The screw press 92 subjects the slurry to the second stage of dewatering. The slurry introduced into the hopper 260 has a moisture content of 75% to 80%, which is reduced by the press 92 to approximately 35 to 40%. A tapered screw 262 is rotatively supported within the press 92 and is rotatively driven by a motor 268. A helical thread 263 wraps itself about the shank of the screw 262 along its entire length. As the screw 262 is rotated, the thread 263 forces the slurry to the right as shown in FIG. 2E. As the slurry is forced to the right, the slurry is compressed against the increasing diameter of the screw shank. A screen 266 is disposed beneath the screw 262 with a close clearance therebetween sufficient only to permit the screw 262 to rotate without interfering with the screen 266. In effect, slurry is compressed between the screw 262 and the screen 266, whereby much if not most of the water is "wrung out" or removed from the slurry. The screen 266 has fine openings therethrough, e.g., 1/32 inch diameter, whereby only the removed water is permitted to pass therethrough to be collected in the bottom of the press 92 and returned through the conduit 88 to the water treatment station 64. The screw 262 forces the slurry into a gate 264, which is set to open at a predetermined pressure to permit the slurry to be discharged, now with most of the water removed, onto the conveyer 94. The gate 264 thus controls the pressure exerted on the slurry and thus the degree of water removal performed by the press 92. The water removal press 92 may illustratively take the form of that horizontal screw press as manufactured by Andritz Ruthner, Inc.

Referring now to FIG. 2F, the receiving end of the conveyer 94 is shown delivering the substantially dried waste pulp from the press 92 into an inlet 276 of the thermal dryer 96, which subjects the slurry to a second stage of drying. The slurry introduced into the inlet 276 has a moisture content of approximately 35 to 40%, which is reduced by the thermal dryer 96 to approximately 15 to 20%. Though only a single shaft dryer 96 is shown in FIG. 2F, it is appreciated that a twin shaft dryer or that a plurality of single shaft dryers could connected together to further dry the slurry dependent upon the tonnage of MSW to processed per day. The thermal dryer 96 comprises a U-shaped jacket 274 with the inlet 276 disposed at one end and a discharge 286 at the other end. A plurality of agitators 280 are mounted along the length of the jacket 274 to be rotated by a drive motor 278. Each agitator 280 includes a pair of paddles 282, which extend from an axis about which the paddles 282 are rotated. A transfer medium heated to a temperature of about 340° F., e.g., superheated steam, is introduced via a medium input 284 to be circulated under a pressure of 105 to 115 psi through an annular passageway (not shown) formed through the paddles 282 from the input 284 to the right as shown in FIG. 2F. Each paddle 282 also has a cavity therein which is in communication with the aforementioned passageway to permit the heated medium to circulate within each paddle 282 and thereby heat the slurry flowing about the exterior of the paddles 282. A return conduit (not shown) is formed centrally of and within the annular passageway to permit the cooled medium to be discharged from a medium outlet 288. A U-shaped breaker bar 283 is associated with each of the plurality of agitators 280 and comprises a pair of arms, which extend between adjacent agitators 280. The bars 283 serve to clean the agitators 280 and to enhance mixing of the slurry. The rotating paddles 282 transport the slurry towards the right as shown in FIG. 2F to be outputted through the discharge 286 and onto the conveyer 98, which transport the dried slurry past the magnetic separator 17c, which is similar to the separator 17 shown in detail in FIG. 2A, and then to the pelletizer 100. Illustratively, the thermal dryer 96 may take the form of a Porcupine Processor as manufactured by the Bethlehem Corporation.

As shown in FIG. 2F, the metering device 99 is positioned to discharge by gravity feed metered quantities of other pellet materials, along with the dried slurry from the screw press 96, into an input hopper 300 of the pelletizer 100. The metering device 99 comprises a storage bin 330 for receiving these materials and a metering chamber 334, in which a metering screw (not shown) is mounted to be rotatively driven by a drive motor 332 at a controlled speed set dependent upon the selected quantity of material to be introduced. The metering device 99 may illustratively comprise the Vibra Screw Feeder as manufactured by Vibra Screw, Inc.

The conveyer 98 transports the dried waste pulp from the thermal dryer 96 to the input hopper 300 of the pelletizer 100. The organic slurry introduced into the hopper 300 has moisture content of approximately 15 to 20%, whereas the pellets 326 produced thereby have a moisture content of 10% or less. For comparison, note that kiln dried wood has a moisture content of 6% and most fire wood burnt domestically has a moisture content of 30 to 50%. A variable speed screw conveyer 302 transports the relatively dry waste pulp from the hopper 300 to a cylindrically shaped cavity, in which there is rotatively mounted an agitator 304. The agitator 304 includes a plurality of paddles 306, which extend radially from a shaft 307 and are spaced at equal angles from each other. The shaft 307 is driven as a constant speed to ensure uniformity of the constituent distribution (including any moisture) throughout the waste pulp. The pulp is forced downward through a chute 308 and a second conveyer screw 310 to be further mixed by a second agitator 312, which is similar to the agitator 302. The second conveyer screw 310, the second agitator 312 as well as a roller assembly 316 are mounted upon a drive shaft 322, which is rotatively driven by a motor 318. The roller assembly 316 comprises a plurality of rollers 317, which are disposed at the same radial distance from the drive shaft 322 and are spaced from each other by equal angles. The roller assembly 316 is rotatively mounted within a cylindrical cavity 320, which includes upon its periphery an annularly shaped die 314. A plurality of openings 324 is distributed evenly about the peripheral surface of the cavity 320; each opening 324 extends radially through the cylindrically shaped portion of the cavity 320. In operation, the waste pulp is forced by the rotatively driven conveyer screw 310 into the cavity 320. As the roller assembly 316 and its rollers 317 are rotatively driven, the waste pulp is forced radially by the rollers 317 through the holes 324 to extrude pellets 326, which fall into and are collected in the bin 102. The pelletizer 100 may illustratively comprise the gear driven Pellet Mill manufactured by Sprout-Bauer, Inc.

The RDF, i.e., the pellets 326, which were produced in accordance with the apparatus and method of this invention have been thoroughly tested at the Old Dominion University, Norfolk, Virginia and have proved to be superior to presently available fuels in a number of respects. The results of these tests have been published in an article entitled, "RDF Test Burns at a Steam Boiler", the Proceedings of the 85th Annual Meeting and Exhibition of the Air & Waste Management Association, Jun. 21-26, 1992. The article conclude that the pellets 326 had uniform moisture content and greater specific heat content. When blends of coal and the pellets 326 were burned, less SO2, HC1 and dioxins were produced. It is contemplated that the pellets 326 could be burned alone and the resulting emissions would meet the standards of the "Clean Air Act" without the use of electrostatic precipitators.

In considering this invention, it should be remembered that the present disclosure is illustrative and the scope of the invention should be determined by the appended claims.

It is claimed:

1. A method for processing waste into a clean fuel, the waste comprising an organic portion and an inorganic portion, the fuel comprising primarily the organic portion, said method comprising the steps of:
    a) maintaining a body of liquid of a selected depth within a float tank;
    b) introducing the waste into the float tank and the body of liquid therein, the liquid body having a bottom and an upper surface, the liquid depth being selected to be sufficiently large to permit the separation of the waste into the organic and inorganic portions;
    c) cleaning the waste within the liquid body by separating the inorganic portion from the organic portion, the organic portion floating to the upper surface of the liquid body, the inorganic portion settling towards the bottom of the liquid body, whereby the inorganic portion is physically separated from the floating organic portion;
    d) removing the cleaned organic portion from the liquid surface and the inorganic portion from the bottom; and
    e) extracting sufficient liquid from the cleaned, separated organic portion to provide the clean fuel.

2. The method of claim 1, further comprising the step of shredding the waste, before introducing it into the liquid body, into components of given dimensions.

3. The method of claim 1, further comprising the steps of adding further liquid to the separated organic portion to form a mixture thereof and pulping the mixture to provide a slurry thereof of a relatively high moisture content, step e) extracts sufficient liquid from the slurry to provide the clean fuel of a sufficiently low, homogeneous liquid content to permit efficient burning of the fuel.

4. The method of claim 3, wherein step e) includes the step of mechanically extracting liquid from the slurry.

5. The method of claim 4, wherein the step of mechanically extracting removes the majority of moisture by weight from the slurry.

6. The method of claim 3, further comprising the step of forming the clean fuel of the sufficiently low, homogeneous liquid content into pellets thereof to permit efficient burning of the fuel.

7. The method of claim 4, wherein step e) includes the step of thermally extracting liquid from the slurry.

8. The method of claim 1, wherein the liquid is water.

9. The method of claim 1, wherein the removed inorganic portion comprises ferrous metals, nonferrous metals and silicon products and there further comprises the step of subjecting the removed inorganic portion to a magnetic field to extract therefrom the ferrous metals and leaving any remaining nonferrous metals.

10. The method of claim 9, further comprising the steps of crushing and then screening the remaining nonferrous metals and silicon products to thereby separate these materials.

11. Apparatus for processing waste into a clean organic material, the waste comprising organic and inorganic portions, said apparatus comprising:
    a) a separation tank for separating the waste into the organic and inorganic portions, said separation tank having a bottom and a top opening, said separation tank containing a body of liquid, the liquid body including a top surface and a bottom portion disposed adjacent said bottom of said tank;
    b) means for introducing the waste through said top opening into the liquid body;
    c) said separation tank having sufficient dimensions to contain a sufficient volume of the liquid body to establish a liquid depth as measured from said bottom of said separation tank to the liquid surface to permit the waste to separate into its organic portion, which floats at the liquid surface, and into its inorganic portion, which settles to bottom portion of the liquid body;
    d) means for removing the separated organic portion from the liquid surface; and
    e) means for extracting liquid from the removed organic portion to provide the clean, dry organic material.

12. The waste processing apparatus as claimed in claim 11, wherein the clean organic material is a fuel and said liquid extracting means extracts sufficient liquid from the organic portion to provide the clean fuel of a sufficiently low water content to be burned.

13. The waste processing apparatus as claimed in claim 11, wherein there is further included means for shredding the waste into particles of limited dimension, said introducing means conveying the shredded waste particles into the liquid body.

14. The waste processing apparatus as claimed in claim 13, wherein said shredding means fixes the limited dimension of the particles and reshreds any of the waste which exceed the limited dimension.

15. The waste processing apparatus as claimed in claim 11, wherein said separation tank has opposing side walls which slant towards each other so that said bottom is of a lesser dimension than that of said opening, whereby the inorganic portion is guided to said bottom of said separation tank.

16. The waste processing apparatus as claimed in claim 11, wherein said organic portion removing means comprises means immersed within the liquid body at a shallow depth from the liquid surface for directing pressurized jets of the liquid in a first direction to transport the separated organic portion towards one end of said separation tank.

17. The waste processing apparatus as claimed in claim 16, wherein said organic portion removing means further comprises means disposed at said one end of said separation tank for removing the transported organic portion from the liquid surface and conveying it to said liquid extracting means.

18. The waste processing apparatus as claimed in claim 16, wherein there is further included means disposed at said bottom of said separation tank for removing the settled inorganic portion from said separation tank.

19. The waste processing apparatus as claimed in claim 18, wherein said separation tank comprises a port disposed adjacent said bottom of said separation tank and at another end thereof opposite said one end thereof, said inorganic portion removing means conveys the settled inorganic portion in a second direction opposite to said first mentioned direction towards said port, whereby the settled inorganic portion is removed through said port and from said separation tank.

20. The waste processing apparatus as claimed in claim 16, wherein said organic portion removing means further comprises second means immersed with the liquid body at a deeper depth from the liquid surface for directing second pressurized jets of the liquid in a second direction opposite to said first direction whereby a circulating current of the liquid is established within the liquid body.

21. The waste processing apparatus as claimed in claim 20, wherein said separation tank comprises a port disposed at another end opposite said one end and at said bottom thereof for permitting the settled inorganic portion to be removed therethrough from said separation tank, and a baffle disposed adjacent said another end and extending from the liquid surface to a depth deeper than the circulating current of the liquid to prevent the removal of the organic portion through said port.

22. The waste processing apparatus as claimed in claim 16, wherein said jets directing means comprises at least one nozzle with a plurality of jet openings spaced along the length thereof, and a pump for pressurizing and providing the liquid to said nozzle.

23. The waste processing apparatus as claimed in claim 16, wherein there is further included means for capturing the liquid escaping from said waste processing apparatus and for recirculating it to said jets directing means.

24. The waste processing apparatus as claimed in claim 23, wherein said capturing means further includes means for removing impurities in the recaptured liquid before recirculating it to said jets directing means.

* * * * *